US011455395B2

(12) United States Patent
Ndu et al.

(10) Patent No.: US 11,455,395 B2
(45) Date of Patent: Sep. 27, 2022

(54) PERFORM VERIFICATION CHECK IN RESPONSE TO CHANGE IN PAGE TABLE BASE REGISTER

(71) Applicant: HEWLETT PACKARD ENTERPRISE DEVELOPMENT LP, Houston, TX (US)

(72) Inventors: Geoffrey Ndu, Bristol (GB); Nigel Edwards, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 182 days.

(21) Appl. No.: 16/903,946

(22) Filed: Jun. 17, 2020

(65) Prior Publication Data
US 2021/0397713 A1 Dec. 23, 2021

(51) Int. Cl.
*G06F 21/57* (2013.01)
*G06F 13/24* (2006.01)
*G06F 12/0815* (2016.01)
*G06F 21/50* (2013.01)
*G06F 12/1009* (2016.01)

(52) U.S. Cl.
CPC ........ *G06F 21/572* (2013.01); *G06F 12/0815* (2013.01); *G06F 12/1009* (2013.01); *G06F 13/24* (2013.01); *G06F 21/50* (2013.01); *G06F 21/57* (2013.01); *G06F 21/575* (2013.01); *G06F 2212/1032* (2013.01); *G06F 2221/033* (2013.01)

(58) Field of Classification Search
CPC ...... G06F 21/57; G06F 21/572; G06F 21/575; G06F 21/50; G06F 12/0815; G06F 13/24; G06F 2212/1032; G06F 2221/033; G06F 12/1009
See application file for complete search history.

(56) References Cited

U.S. PATENT DOCUMENTS

| 6,446,034 B1 * | 9/2002 | Egolf | G06F 9/45554 711/208 |
| 2009/0172330 A1 * | 7/2009 | Dewan | G06F 12/145 711/E12.001 |
| 2012/0278588 A1 | 11/2012 | Adams et al. | |
| 2015/0013002 A1 * | 1/2015 | Smith | G06F 21/64 726/17 |
| 2015/0199507 A1 * | 7/2015 | Azab | G06F 21/50 726/22 |

(Continued)

OTHER PUBLICATIONS

Cox et al., "A 3D-Stacked Architecture for Secure Memory Acquisition", May 2016, 16 pages.

(Continued)

*Primary Examiner* — Glenn A. Auve
(74) *Attorney, Agent, or Firm* — Hewlett Packard Enterprise Patent Department (57) ABSTRACT

Examples disclosed herein relate to performing a verification check in response to receiving notification. A computing system includes a host processor, memory coupled to the host processor, and a device separate from the host processor capable of accessing the memory. The host processor has a page table base register. The host processor is configured to send a notification to the device when the page table base register changes. The device performs a verification check in response to receiving the notification.

20 Claims, 4 Drawing Sheets

(56) References Cited

U.S. PATENT DOCUMENTS

2018/0019875 A1* 1/2018 Sahita ................ G06F 12/1491

OTHER PUBLICATIONS

Intel Corporation, "Intel® Trace Hub (Intel® TH) Developer's Manual Revision 2.1.2," Oct. 2017, pp. 1-549.

Jang et al., "ATRA: Address Translation Redirection Attack against Hardware-based External Monitors", Proceedings of the ACM SIGSAC Conference on Computer and Communications Security, Nov. 3-7, 2014, 12 pages.

Kochar et al., "Exploiting the True Potential of At-Scale Debug," OCP Summit, Mar. 14-15, 2019, 11 pages.

Lee et al., "A Dynamic Per-context Verification of Kernel Address Integrity from External Monitors", Aug. 2018, 29 pages.

Moon et al., "Architectural Supports to Protect OS Kernels from Code-Injection Attacks", Jun. 18, 2016, 8 pages.

* cited by examiner

PERFORM VERIFICATION CHECK IN RESPONSE TO CHANGE IN PAGE TABLE BASE REGISTER

BACKGROUND

Computing devices and systems may utilize runtime integrity software to detect malicious programs. The runtime integrity software may execute in the same space as the components that are monitored, thus potentially exposing the runtime integrity software to the same risks posed by the malicious programs.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Computing devices may utilize runtime integrity software to detect malicious programs. The runtime integrity software may execute in the same space as the components that are monitored, thus potentially exposing the runtime integrity software to the same risks posed by the malicious programs.

A broad class of cyber security attacks involve an adversary injecting code or changing read-only data. These attacks can be detected and remedial action taken as critical parts of a production kernel should not change or only change in predictable manner once a kernel reaches "steady state". An external kernel monitoring solution can be used in detecting such an attack.

An external kernel monitoring may not be able to monitor changes to a Page Table Base Register (PTBR) such as the CR3 register in the x86 architecture and the Translation Table Base Register (TTBR) in the Advanced RISC Machine (ARM) architecture. Without being able to monitor these changes, it can be difficult to detect a class of attack dubbed Address Translation Redirection (ATR).

An ATR attack redefines a kernel's virtual to physical address mappings, in the kernel's paging mechanism, by modifying the corresponding physical address of the virtual address of the monitored page. An attacker, therefore, can relocate pages out of the external monitor's sight. A relocation attack basically moves entire or parts of a kernel to another location to stay out of the monitored range. External monitors are incapable of detecting this attack if the monitors cannot see Page Table Base Register of the host processor. Since each process has its own PTBR value, it is difficult to reliably trace the active paging mappings without knowing the value in the PTBR.

Accordingly, various examples disclosed herein uses a real-time system tracing to monitor changes to the PTBR externally. Real-time tracing goes by different names depending on processor type, for example INTEL Processor Trace (INTEL PT), ARM Core Sight, etc. Real-time tracing may be configured to provide information over a bus such as PCIe and may support industry standard protocols such as MIPI System Trace Protocol (STP).

Further, in various examples, the device can also continually monitor critical kernel code regions and data structures. The device can take remedial action such as shutting down the computing system, logging issues, sending out alert messages, etc. when tampering is detected.

Figure 1:
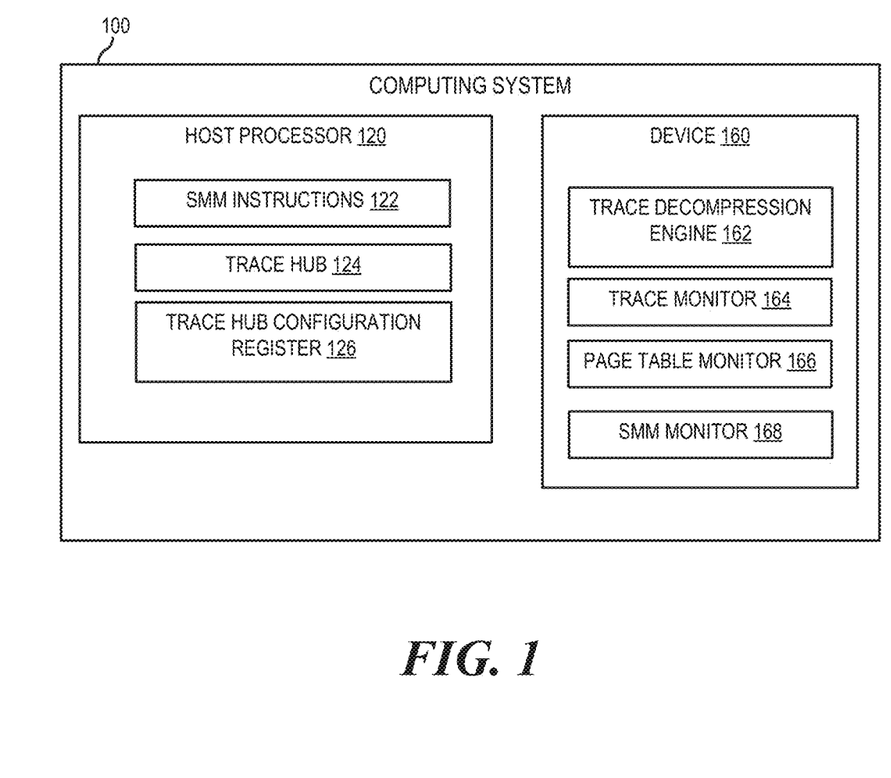
FIG. 1 is a block diagram of a computing system capable of performing a verification check in response to a notification that a content of a page table base register has changed, according to an example.

FIG. 1 is a block diagram of a computing system capable of performing a verification check in response to a notification that a content of a page table base register has changed, according to an example. Computing system 100 can include a host processor (120) including a System Management Mode instructions 122, a trace hub 124, and one or more trace hub configuration register 126. Further, the computing system 100 can include a device 160 such as a BMC or other ASIC or engine capable of performing the features described. The device 160 can include a trace decompression engine 162, a trace monitor 164, a page table monitor 166, and a SMM monitor 168.

Though a single host processor 120 is shown in the computing system 100, it is contemplated that multiple host processors 120 can be protected by the system. Further, it is contemplated that the host processor 120 can include a single core, can include multiple cores, and the like. Moreover, it is contemplated that the same approach can be performed on multiple cores of a processing element. When referring to a host processor herein, the host processor can include one or more core of a processing element as well as shared functionality between multiple cores of the processing element (e.g., a trace hub 124).

In examples described herein, the processor and/or chipset has a hub such as a trace hub 124, that collects, pre-processes, and sends traces via a bus or interconnect fabric (e.g. PCIe) to third party devices 160 (e.g., a baseboard management controller (BMC), a verification engine, etc.). A trace hub configuration register 126 can be used to configure the trace hub 124. This may include, for example, information about when to send a notification (e.g., when a context change occurs), where to send the notification (e.g., a location of the device 160 on an interconnect), etc.

Some examples are described using terminology associated with an INTEL processor and/or chipset to simplify the disclosure for understanding, however, similar features and techniques for use with other technologies (e.g., ARM and other processor architectures) are contemplated. Thus, the solution can be equally applied to other modern processors.

In examples described herein, the Trace Hub 124 on the host processor 120 is configured to capture and send the contents of Page Table Base Register (CR3 in x86, TTBR in ARM, etc.) to the device 160 used for verification (e.g., a BMC, an application specific integrated circuit (ASIC), etc.) each time it changes. The device 160 is to perform a verification check in response to receiving the contents. The verification check can include, for example, checking whether there is an indication that a user-space protection has been disabled, whether a kernel space mapping includes a memory page that is both writable and executable, whether there is a mismatch in a number of executable pages between a kernel page table of a process and a root kernel master page table, etc. as further described herein.

The trace hub 124 on the host processor 120 can be configured to capture and send the contents of Page Table Base Register (CR3 in x86, TTBR in ARM, etc.) to the device 160 each time it changes. Traces are often compressed to reduce bandwidth. Accordingly, the trace decompression engine 162 can be used for decompressing traces from the host processor 120. Once the trace is decompressed, it is passed to the trace monitor 164. The trace monitor 164 is responsible for activating the page table monitor 166 and the SMM Monitor 168. SMM stands for System Management Mode. The page table monitor 166 can perform a verification check on the page table mappings of the current process. Further, the SMM Monitor 168 can perform verification checks on the host processor's context. This can be based on instructions configured by system firmware at boot time.

With these approaches, the trace monitor 164 on the device 160 can be notified each time there is a process context switch. The process context switch will then trigger verification checks using the SMM monitor 168 and the page table monitor 166. The trace monitor 164 can adopt a number of strategies for activating the monitors for performing verification checks.

One example strategy can include triggering checks each time there is a process context switch. Another example strategy can include triggering checks when a "new" process is created. This reduces verification overhead. Another example strategy can include triggering the less disruptive page table monitor 166 on each process context switch and triggering SMM monitor 168 periodically (e.g., on every nth number of switches). In this example, "n" may be fixed or random. Further, another mechanism can be used to determine how often to trigger the SMM monitor 168.

On a typical kernel, the critical parts of a kernel must point to the same physical memory irrespective of the process. In one example, the page table monitor 166 checks each process' page mappings to ensure that if a violation of this security invariant is detected and an alert raised.

In another example, the page table monitor 166 compares the mapping of critical parts of the kernel such as kernel text (code), kernel read only memory, Loadable Kernel Module (LKM) text, LKM read only memory, etc., against a golden reference. A golden reference can be obtained by running a driver in the host OS early on in the OS boot process.

Further, in other examples, the page table monitor 166 can perform other simple verifications. In one example, the verification can include checking that the kernel space mappings does not violate W xor X (Operating systems usually do not allow both writable and executable memory page). In another example, the verification can include looking for malicious page table permissions, for example, system region (Page Map Level 4) PML4 entries in windows marked as user space. In another example, the verification can include verifying that a kernel process does not have user space mappings. A further example can include confirming that there is no mismatch between a process's kernel page tables and root kernel master page tables, for example, a difference in the number of executable pages.

In one example, the system firmware can be used to deploy an SMM (System Management Mode) code module. The code module can be used to configure the host processor 120 to provide register contents in response to a request from the device. In one example, the code module can be used to copy and send the host processor's context (e.g., the current state of the processor to the device 160 when a System Management Interrupt (SMI) is triggered. Using this approach, the device 160 can inspect security critical registers such as: control registers (CR2, CR3, CR4, and CR8), memory management registers (CS, DS, ES, FS, GS, and SS) and model-specific registers (SYSENTER_CS_MSR, SYSENTER_EIP_MSR and SYSENTER_ESP_MSR).

As used herein, a verification check verifies that a state of the computing system complies with a policy or certain criteria. The device 160 can perform checks on the processor context and raise an alert if register values are not in expected regions (e.g., outside of expected or desired parameters or values). For example, device verifier can trigger an alert if CR4.SMEP and CR4.SMAP are disabled. Enablement of SMEP and SMAP makes it harder for malicious programs to "trick" the kernel into using instructions or data from a user-space. Therefore, disabled SMEP or SMAP is an indicator of compromise.

Another check is to ensure MSRs (SYSENTER_CS_MSR, SYSENTER_EIP_MSR and SYSENTER_ESP_MSR) used by Fast System Calls instructions are consistent. That is, the MSRs can be checked to ensure that they are the same in each process. In this example, any divergence is an indicator of potential compromise.

Communication between the SMM code module and device 160 can be performed over a bus or a standard interconnect like PCIe. Further, the communication can be integrity protected with message authentication code (MAC) and a secret key know only to the module and the device 160.

In some examples, deeper introspection can be performed using a buffer. The system can buffer processor context information gathered during SMM on the processor's side. The device 160 can then perform more extensive and time consuming checks asynchronously. In this scenario, the monitors 164, 166, 168 are no longer required to keep up with rate of SMI or the rate of context switches. For example, SMM can be used to collect jump tables containing pointers to executable code and buffer them on system memory. A verifier on the device 160 can asynchronously pull the information and check that the pointers, which are kernel invariants, are the same for every process. Additional checks, which may be time consuming, like following the code pointers of a jump table and ensuring that pointers are actually pointing to the same code can thus be performed asynchronously. Buffering allows system to continue performing simpler checks synchronously and in near real-time while more complex checks can be performed asynchronously, for example, on best effort basis.

The buffered context information can be protected from tampering with a security co-processor such as a Trusted Platform Module (TPM) or can be stored in a special memory enclave accessible only from the processor's SMM mode and the device 160. In some examples, the system can buffer information in a reserved area in system memory protected against tampering by the OS using message authentication code (MAC). In this example, keys for generating the MACs are known only by the SMM code module and the device 160.

The monitors and engines 162, 164, 166, 168 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. As noted above, the device 160 can be implemented using an ASIC. In some examples, the device 160 can be implemented as a BMC.

Figure 2:
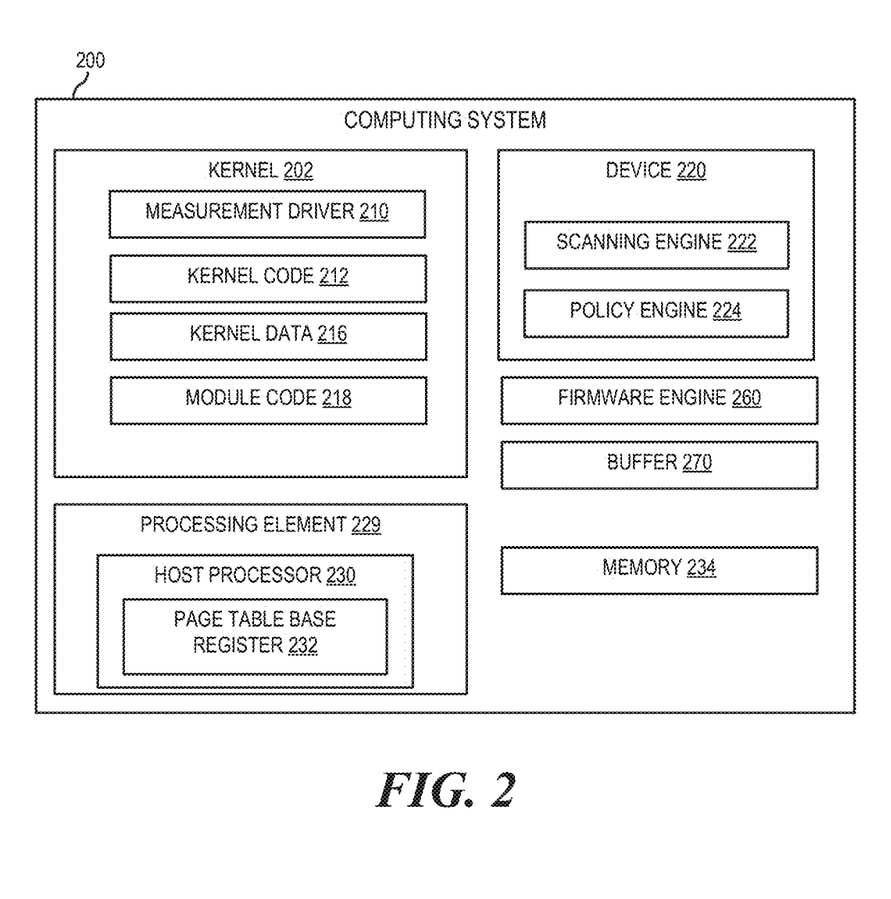
FIG. 2 is a block diagram of a computing system capable of performing a verification check in response to a notification that a content of a page table base register has changed, according to an example.

FIG. 2 is a block diagram of a computing system capable of performing a verification check in response to a notification that a content of a page table base register has changed, according to an example. Computing system 200 can include a kernel 202 that includes a measurement driver 210, kernel code 212, kernel data 216, and module code 218. Further the computing system 200 can include a processing element 229 including a host processor 230 with a page table base register 232. Though not shown, the processing element can include SMM instructions, a trace hub, and a trace hub configuration register. Further, some of these capabilities may be shared between multiple host processing cores. A device 220 separate from the host processor 230 can include a scanning engine 222 and a policy engine 224. Further, a firmware engine 260 can be implemented to configure the computing system 200 including the host processor 230. A buffer 270 can be implemented using a memory to enable asynchronous verification checks.

As used herein, a "computing system" may be a storage array, storage device, storage enclosure, server, desktop or laptop computer, computer cluster, node, partition, or any other device or equipment including a controller, a processing resource, or the like that can include a device 220 separate from the host processor 230 that can be used for measuring memory 234 as described herein. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. As used herein, the processor or set of host processors 230 that load and are intended to execute the operating system (e.g., kernel) is separate from the device 220. As noted above, the host processor 230 can be implemented as a core of a chip with multiple processors. Each of these cores can have a separate page table base register.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory. In some examples, memory 234 or a portion of memory 234 can include RAM and be accessible to both the host processor 230 and the device 220 via a bus or interconnect.

As used herein, a "device" 220 may be any microcontroller, BMC, circuit, CPU, microprocessor, GPU, FPGA, chassis manager, rack level manager, server, TPM, other electronic circuitry suitable to measure data structures in memory, or a combination thereof. For example, the device 220 may be a BMC of a server. In another example, the device 220 may be a top of rack switch or management module. In such examples, the device 220 may operate independently of each system within the racks OSes. In such examples, the device 220 may take the measurements of each systems kernel space in each systems memory.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis including system memory. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

As used herein, an "operating system" or "OS" is machine-readable instructions that may be stored in a machine-readable storage medium and executed by a processing resource. An OS may include system software that manages computer hardware and software resources, as well as providing common services for computer programs. The OS may facilitate communications between a computing devices hardware and applications. The OS may include a user interface that allows a user to interact with the computing device. The OS may include layers, such as an application layer and a kernel layer. High level applications (as in, applications that a user may interact with) may execute at the application layer of an OS, while the kernel layer may include machine-readable instructions that control the computing devices hardware. During the setup or initialization of a computing device, an OS may be installed. During a computing devices boot or start-up process, the OS is loaded into a machine-readable storage medium. As noted above, a processor or processing resource of the computing device may execute the OS from the machine-readable storage medium.

As used herein, a "kernel" may be a part of the OS. The kernel may be the part of the OS that provides the most basic level of control over all of the computers hardware devices. The kernel may manage memory accesses, allot hardware resources, manage the processing resources operating states, and manage data. In one example, the OS may include a kernel that is static. In other examples, the OS may be dynamic, but known static parts can be measured.

A kernel space may be a part of a virtual memory system including page tables and an address translation system of a computing device. The page table may map virtual addresses of a program into physical addresses in computer memory of computing device, such as a machine-readable storage medium or other memory device. A processor of the computing device may segregate the virtual memory of the computing device into the kernel space and a user space. For example, the kernel space may be reserved for running the kernel, kernel extensions, and device drivers. The user space, in contrast, may be the memory area where applications and services are executed.

As used herein, a "process" is an instance of a computer program that is to be executed by one or many threads. The process includes the program code and its activity. A portion of the process can run in kernel space while another portion of the process can run in user space. As used herein, "user space" is a set of locations where normal user processes run (e.g., everything outside of the kernel). The role of the kernel is to manage applications running in this space from inappropriately interacting with each other and the machine.

As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

As used herein, a "trusted platform module" or "TPM" may be an integrated circuit built into a motherboard of a computing system. The TPM may be tamper resistant or tamper proof. The TPM may be utilized for services on the computing system. The services may include device identification, authentication, encryption, measurement, determine device integrity, secure generation of cryptographic keys, remote attestation, and sealed storage. The TPM may include platform configuration registers (PCRs). The PCRs may store security relevant metrics. Machine-readable instructions (such as a kernel) or devices may extend the PCR with data. To extend a PCR with a measurement, the machine readable instructions or device extending the PCR may send a new value to the TPM. The TPM may take a hash of the new value and the current value in the PCR. The TPM may store the result in the PCR.

As used herein, a "Root of Trust device" or RoT device may be a device that behaves in an expected manner, as the RoT devices misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values. For example, the RoT may be a TPM. In such examples, the TPM may include a PCR (or a plurality of PCRs). Further, the RTS may be a PCR (or a plurality of PCRs). In another example, the RoT may include a Root of Trust for Reporting (RTR). The RTR may be a compute engine capable of sending requested information to a requesting device. The information may include the contents in a register of the RoT (or the contents of the RTS) and information specified by the requester. The RoT may include other compute engines not described here, such as a compute engine to measure specified values or a compute engine to authenticate.

As used herein, a "buffer" may be a region of memory to be utilized for storing data temporarily, while the data is moved from one location to another. The buffer may be a fixed size or a variable size. The buffer may be located in the machine-readable storage medium of the system. Further, the buffer may be located in the memory of the system.

As used herein, an "agent" may be an application program, in other words, machine-readable instructions. The agent may be installed on the system or a device of the system. The agent may operate in a machine-readable storage medium. For example, an agent may reside in the machine-readable storage medium of a BMC or of a system. The agent may communicate through a representational state transfer (REST) application program interface (API), IOCTL interfaces, or some other communication method with other devices or software. For example, an agent may reside in the machine-readable storage medium of a BMC and communicate with an OS through an IOCTL interface.

Firmware engine 260 can be implemented using instructions executable by a processor and/or logic. In some examples, the firmware engine 260 can be implemented as platform firmware. Platform firmware may include an interface such as a basic input/output system (BIOS) or unified extensible firmware interface (UEFI) to allow it to be interfaced with. The platform firmware can be located at an address space where the processing element (e.g., CPU) for the computing system boots. In some examples, the platform firmware may be responsible for a power on self-test for the computing system 200. In other examples, the platform firmware can be responsible for the boot process and what, if any, operating system to load onto the computing system 200. Further, the platform firmware may be capable to initialize various components of the computing system 200 such as peripherals, memory devices, memory controller settings, storage controller settings, bus speeds, video card information, etc. In some examples, platform firmware can also be capable to perform various low level functionality while the computing system 200 executes. Moreover, in some examples, platform firmware may be capable to communicate with a higher level operating system executing on a CPU, for example via an advanced configuration and power interface (ACPI).

As noted above, the host processor can include a page table base register 232. As used herein, a "page table base register" is a register in the host processor 230 or CPU that includes information about the base address for the page table of the current process being executed on the host processor 230 or CPU. As noted herein, a processing element can include multiple cores/CPUs/host processors and hence multiple PTBRs. The PTBR 232 can include the base address of the translation table and information about the memory it occupies. In the INTEL x86 architecture an example of this register is the CR3 register. In the ARM architecture, an example of this register is the Translation Table Base Register.

During a boot process, the firmware engine 260 can be executed by a processing element 229. This can be used to perform configuration of the computing system 200. The firmware engine 260 can be executed at a boot time prior to handing the computing system's operation over to an operating system. As part of the configuration, the firmware engine 260 can configure the processing element 229 including the host processor 230 to provide a notification that a content of the PTBR 232 has changed to the device 220 when the content is changed. This can be implemented by configuring a real-time system tracing functionality of the processing element 229. Examples of the real-time system tracing functionality include INTEL Processor Trace, ARM Core Sight, etc. In some examples, the notification includes contents of the register. Generally, the content of the PTBR 232 changes when a new process is executed.

During the boot time, the firmware engine 260 can lock configuration of the notification in a manner such that the operating system is not able to modify the locked configuration. In modern processors, firmware can lay claim to resources, locking down can include laying claim to particular resources, for example, the real time tracing features so that the firmware used for configuration locks the resources. In certain examples, claiming resources may include laying claim to registers that are associated with the support monitoring described herein, for example, the registers related to configuration of the notification. The configuration can specifically set the tracing feature to send particular information (e.g., notifications, SMM information, etc.) to the device via an interconnect (e.g., PCIe). In some examples, the device 220 can additionally communicate with the processing element 229 to use a shared secret (e.g., a key) to sign or encrypt communications between the device 220 and the portion of the processing element 229 used for implementing tracing features. For example, message authentication code and a shared secret can be used in communications. Further, the firmware can be used to configure the processing element 229 to send the contents of particular registers in response to a management interrupt sent by the device 220. This can be configured using a policy.

Once the boot process is over, the OS can take over. As noted above, the processing element 229 (which can include at least one host processor 230) can be configured to provide a notification that a content of the PTBR 232 has changed.

In one example, the PTBR 232 changes. The processing element 229 sends a notification to the device 220. A policy engine 224 of the device 220 can receive the notification. In some examples, the notification can include the contents of the PTBR 232. Further, in other examples, the device 220 can have access to a previous contents of the PTBR 232 and can thus perform analysis on differences. In other examples, the notification can also include contents of other registers associated with the host processor 230.

In response to receiving the notification, the policy engine 224 can determine to perform a verification check. The particular verification check to be performed can be based on a policy (e.g., a rules based policy).

In one example, the verification check is triggered when there is a process switch. In another example, the verification check is triggered when a new process is created. This would reduce overhead on verification checks. In another example, a simple or light-weight verification check is performed on a context switch and another policy is set for additional verification checks. For example, a verification check that includes using a SMM request for additional information can be performed periodically, for example, based on a count of context switches, based on a timer, etc.

In one example of a verification check, a scanning engine 222 can request additional register contents from the processing element 229 by sending a management interrupt to the processing element 229. The register contents can be considered critical security contents that can be related to particular security verifications. Configurations can set to provide the contents of particular registers in response to the management interrupt. More than one configurations are possible and in some examples, the interrupt may be configured to select which contents to send. As noted above, particular control registers (e.g., CR2, CR3, CR4, CR8), memory management registers (CS, DS, ES, FS, GS, SS, etc.), and model-specific registers (e.g., SYSENTER_CS_MSR, SYSENTER_EIP_MSR, SYSENTER_ESP_MSR, etc.) can be configured to be sent in response to a management interrupt. Accordingly, the processing element provides a plurality of register contents in response to the management interrupt.

In one example, the verification check includes determining, based on one of the register contents, whether indication that a user-space protection has been disabled. For example, the policy engine 224 can trigger a security action if CR4.SMEP and/or CR4.SMAP are disabled. SMEP and SMAP make it harder for malicious programs to trick a kernel into using instructions or data from a user-space. Another example can be checking system region Page Map Level 4 (PML4) to ensure that the entries are not marked as user.

In another example, the policy engine 224 can determine whether kernel space mappings, when examined, violate a W xor X. Operating systems usually do not allow for a memory page to be both writable and executable. If it is, it is a potential threat, thus it may be against a policy set by the device 220 and trigger a security action.

In a further example, the device 220 can check the register contents to determine whether there is a mismatch in a number of executable pages between a kernel page table of a process and a root kernel master page table. A mismatch can indicate that something malicious happened to the process' kernel page table.

In another example, the device 220 can compare code referenced by one of the register contents to a golden reference for the referenced code. In some examples, the golden reference can be captured at a boot up portion of the computing system 200 or using other techniques.

Security actions can include providing a notification of the verification check. This can include logging the event, sending an email, sending a notification to a dashboard, etc. Other security actions can also be performed, for example, quarantining the computing system 200 by shutting down communication ports, etc. In other examples, data can be transferred off of the computing system prior to quarantining.

As noted above, the verification check or a second verification check that is more in depth can occur in response to a second trigger. The trigger can be a timer, a count of context changes, etc. In some examples, the second verification check can include verification of multiple buffered context information. In some examples, the verifications can include a more complete verification of the kernel code 212, kernel data 216, module code 218, etc. For example, the computing system 200 can use the buffer 270 (e.g., a buffer in system memory) to collect jump tables containing pointers to executable code. These can be processed asynchronously based on the trigger.

In one example, using these approaches, trust in state information of a computing system is verified. In this example, the state information includes at least the kernel code 212 and module code 218, for example, module code and/or drivers used in basic operation of the computing system 200. In one example, trust can be initially verified using a chain. For example, when the computing system 200 is initialized, firmware engine 260 can verify a boot loader, for example, by using a key. The boot loader can boot the kernel code 212 after verifying the kernel code is signed using a second trusted key. The kernel then verifies module code 218 for loading using a third trusted key. The module code 218 can include, for example, code of the process that is switched in or out from the PTBR 232. The trusted keys can be the same key or a different key and be stored at a trusted location (e.g., at a BMC, at the device 220, at a TPM, etc.). This can be implemented using a secure boot. In other examples, verification may be enabled using a measured boot approach.

The processing element can load the kernel code 212 and module code 218 into memory 234. The memory 234 can be accessible by the device 220, which is separate from the processing element 229. The measurement driver 210 can be verified and loaded into the memory 234.

The state information can correspond to multiple symbols. The symbols can each be associated with a section of memory. The symbols can be used to identify sections of the memory, for example, particular functions associated with code, tables, etc. A measurement driver 210 can be configured for a particular kernel code, module code, and other state information that is loaded to know what symbols to track. The measurement driver 210 can further be configured to use kernel code to determine various information about the symbols, for example, the size of the symbol, a start of the symbol, an end of the symbol, a start of a next expected symbol, etc. Different kernel codes may have different functions to enable gathering of the information. The information can be used to determine a start address of each of the symbols and a size of the symbol.

The measurement driver 210 can measure the state information before a set of other modules are loaded. The state information corresponding to each of the symbols can be used to generate a set of initial measurements. In one example, the measurement driver can measure the corresponding state information for each symbol. The measurement driver 210 or other agent can then provide the set of initial measurements associated with the respective symbols to the device 220 for integrity monitoring. The providing of the information can be via a buffer and/or interconnect as described above or some other communication method that is accessible to the device 220 and initialized kernel. The state information for the symbols measured at this time can be in a steady state, where it is not expected for the information to change.

As used herein "state information" is a set of data corresponding to respective symbols that are not expected to change state after measurement. If there is a change in the information, it can be considered an integrity violation, which may indicate malicious intent.

The initial measurements can include hashes of the respective state information associated with the corresponding symbols. In some examples, a message communicated between the measurement driver 210 and the device may include a packet header, a symbol name, an address, a size of the symbol, and a hash digest generated from a cryptographic hash algorithm with the information stored from the address for the size. In some examples, padding can be added to a message to facilitate simple communications. Thus, in some examples, the initial measurements can include a location of each respective symbol being tracked in the memory and a size of the respective state information associated with the particular symbol.

In some examples, once the measurement driver 210 is loaded, the measurement driver 210 will hook into a function (or multiple functions) in the kernel code responsible for loading other modules 218. This can occur before baseline measurements are taken. When the other modules 218 are loaded, symbols associated with the other modules 218 can be measured using a similar approach as described above. Thus, respective baseline measurements associated with other state information associated with each of the other symbols can be measured. The baseline measurements for the other symbols can be sent to the device 220.

The device 220 can monitor the respective state information in the memory 234 associated with each of the symbols for which an initial or baseline measurement was taken. The monitoring can be performed by measuring, by the device 220, the state information corresponding to each of the symbols to determine a second set of measurements for the respective symbols. The device 220 can compare the second set of measurements with the initial or baseline measurements. The comparison can be one at a time (e.g., a current measurement of one symbol compared to the baseline or initial measurement for that symbol). In some examples, the device determines that there is a violation based on the comparison. This can occur if the comparison of two measurements for a symbol does not match. A security action can be performed in response to the determination of the violation. As noted above, the security action can include one or more of logging of the violation, sending an alert of the violation, shutting down of the computing system 200, re-initializing of the computing system, or other pre-determined action to remediate upon detection of the violation.

Figure 3:
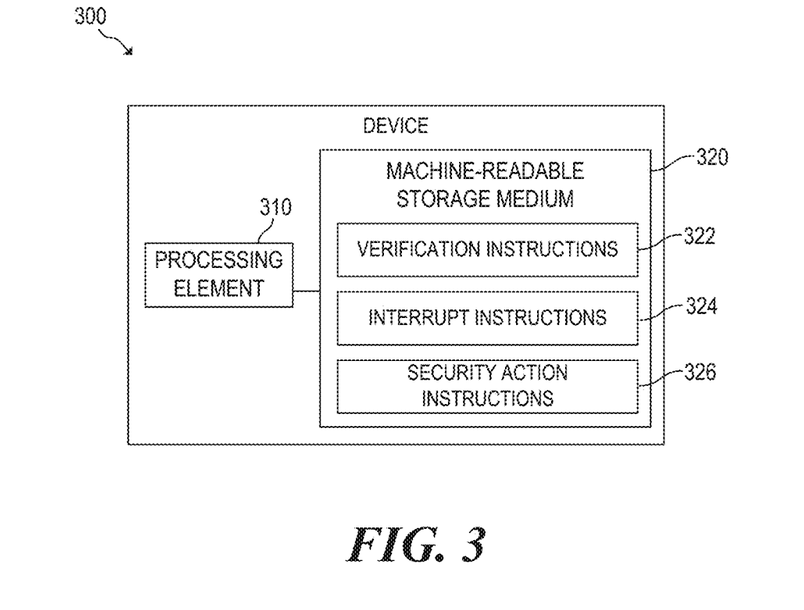
FIG. 3 is a block diagram of a device to perform a verification check in response to a notification that a content of a page table base register changed, according to an example.

FIG. 3 is a block diagram of a device to perform a verification check in response to a notification that a content of a page table base register changed, according to an example. Device 300 includes a processing element 310, and a machine-readable storage medium 320 including instructions 322, 324, 326 for performing a verification check. Device 300 may be, for example, an ASIC, a BMC such as BMC 400, another controller, etc.

Processing element 310 may be, one or multiple central processing unit (CPU), one or multiple semiconductor-based microprocessor, one or multiple graphics processing unit (GPU), other hardware devices suitable for retrieval and execution of instructions stored in machine-readable storage medium 320, or combinations thereof. The processing element 310 can be a physical device. Moreover, in one example, the processing element 310 may include multiple cores on a chip, include multiple cores across multiple chips, multiple cores across multiple devices, or combinations thereof. Processing element 310 may fetch, decode, and execute instructions 322, 324, 326 to implement perform a verification check in response to receiving a notification. As an alternative or in addition to retrieving and executing instructions, processing element 310 may include at least one integrated circuit (IC), other control logic, other electronic circuits, or combinations thereof that include a number of electronic components for performing the functionality of instructions 322, 324, 326.

Machine-readable storage medium 320 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 320 may be encoded with a series of executable instructions for performing a verification check (e.g., for performing method 600).

The device 300 can receive a notification from a host processor that content of a PTBR has changed. Verification instructions 322 can be performed in accordance with a policy as noted above. In some examples, interrupt instructions 324 can be executed to request and receive additional information from the host processor. Once a verification check has been performed, a security action can be taken in accordance with the features described herein by executing security action instructions 326.

Figure 4:
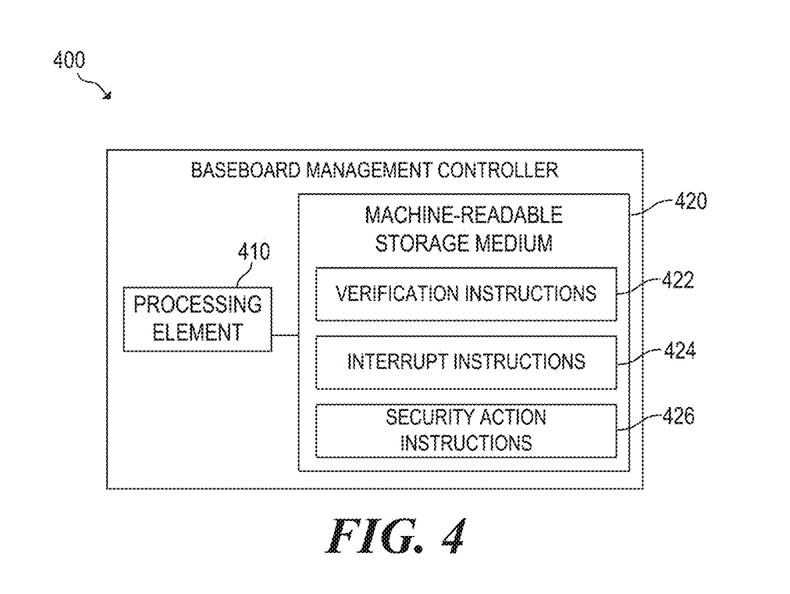
FIG. 4 is a block diagram of a baseboard management controller capable to perform a verification check, according to an example.

FIG. 4 is a block diagram of a baseboard management controller capable to perform a verification check, according to an example. The BMC 400 can include a machine-readable storage medium 420 that includes verification instructions 422, interrupt instructions 424, and security action instructions 426 that correspond to the instructions of device 300. The BMC 400 can also include a processing element 410 for executing the instructions. In some examples, the BMC 400 can provide additional functionality as described above.

Figure 5:
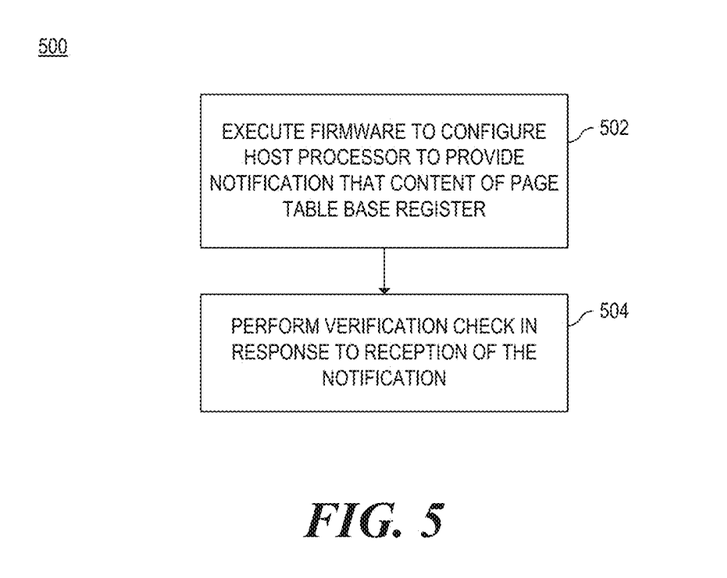
FIG. 5 is a flowchart of a method for performing a verification check in response to a notification that a content of a page table base register changed, according to an example.

FIG. 5 is a flowchart of a method for performing a verification check in response to a notification that a content of a page table base register changed, according to an example. Although execution of method 500 is described below with reference to system 200, other suitable components for execution of method 500 can be utilized. Method 500 may be implemented in the form of executable instructions stored on a machine-readable storage medium, such as a storage medium, and/or in the form of electronic circuitry.

At 502, firmware can be executed to configure a host processor to provide notification that content of a PTBR has changed in response to the content being changed. Further, the firmware can be executed to send a plurality of register contents to the device in response to a management interrupt as described above. As noted above, the configuration can occur during a boot process and be locked down prior to turning the execution of the computing system to an OS. When a context change occurs, the host processor sends the notification to the device 220.

At 504, the device 220 performs a verification check in response to receiving the notification. The verification check can be light-weight or can be comprehensive. In one example, a light-weight check is performed in real time and a comprehensive check is performed at an asynchronous cadence.

Figure 6:
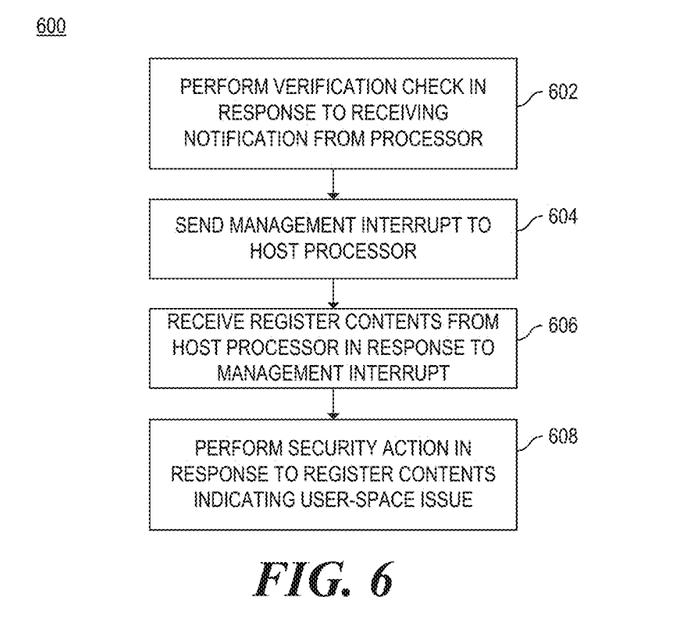
FIG. 6 is a flowchart of a method for performing a verification check, according to an example.

FIG. 6 is a flowchart of a method for performing a verification check, according to an example. Although execution of method 600 is described below with reference to device 300, other suitable components for execution of method 600 can be utilized (e.g., BMC 400). Method 600 may be implemented in the form of executable instructions stored on a machine-readable storage medium, such as storage medium 320, and/or in the form of electronic circuitry.

The device 300 can receive a notification from a host processor that contents of a PTBR has changed. At 602, in response to receiving the notification, processing element 310 can execute verification instructions 322 to perform a verification check.

As part of the verification check, at 604 interrupt instructions 324 can be executed by processing element 310 to send a management interrupt to the host processor. The host processor can send, in response to the management interrupt, a plurality of register contents associated with the host processor (e.g., control registers, memory management registers, model-specific registers, etc.). The device 300 can receive the contents (606). The contents can be used to perform the verification check as detailed above.

A security action can be performed in response to examination of one of the register contents indicating a user space issue. For example, a security action can be performed in response to indication that a user-space protection has been disabled (608). As noted above, the security action can include one or more of logging of the violation, sending an alert of the violation, shutting down of the computing system, re-initializing of the computing system, or other pre-determined action to remediate upon detection of the violation.

As noted, the register contents related to the interrupt can be considered critical security contents that can be related to particular security verifications. Configurations can set to provide the contents of particular registers in response to the management interrupt. More than one configurations are possible and in some examples, the interrupt may be configured to select which contents to send. As noted above, particular control registers (e.g., CR2, CR3, CR4, CR8), memory management registers (CS, DS, ES, FS, GS, SS, etc.), and model-specific registers (e.g., SYSENTER_CS_MSR, SYSENTER_EIP_MSR, SYSENTER_ESP_MSR, etc.) can be configured to be sent in response to a management interrupt.

In one example, the verification check includes determining, based on one of the register contents, whether indication that a user-space protection has been disabled. For example, a security action can be triggered if CR4.SMEP and/or CR4.SMAP are disabled. SMEP and SMAP make it harder for malicious programs to trick a kernel into using instructions or data from a user-space. Another example can be checking system region Page Map Level 4 (PML4) to ensure that the entries are not marked as user.

In another example, if kernel space mappings, when examined, violate a W xor X, a security action can be taken. Operating systems usually do not allow for a memory page to be both writable and executable.

In a further example, the device 300 can check the register contents to determine whether there is a mismatch in a number of executable pages between a kernel page table of a process and a root kernel master page table. A mismatch can indicate that something malicious happened to the process' kernel page table and a security action can be taken.

In another example, the device 300 can compare code referenced by one of the register contents to a golden reference for the referenced code. In some examples, the golden reference can be captured at a boot up portion of the computing system or using other techniques as described above.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing system comprising:
at least one host processor;
memory coupled to the at least one host processor; and
a device separate from the at least one host processor capable of accessing the memory,
wherein the at least one host processor includes a page table base register, wherein the at least one host processor is to:
execute firmware to provide a notification that a content of the page table base register has changed to the device in response to the content being changed,
wherein the device is to perform a verification check in response to receiving the notification.

2. The computing system of claim 1,
wherein the firmware is executed by the at least one host processor to configure the at least one host processor to send a plurality of register contents to the device in response to a management interrupt.

3. The computing system of claim 2,
wherein the device is further to send the management interrupt to the at least one host processor as part of the verification check in response to receiving the notification.

4. The computing system of claim 3, wherein the notification includes the content.

5. The computing system of claim 2, wherein the firmware is executed at a boot time prior to handing computing system operation over to an operating system to lock configuration of the notification by claiming resources in a manner such that the operating system is not able to modify the claimed resources.

6. The computing system of claim 2, wherein the verification check includes determining, based on one of the register contents, indication that a user-space protection has been disabled.

7. The computing system of claim 2, wherein the verification check includes determining whether a kernel space mapping includes a memory page that is both writeable and executable.

8. The computing system of claim 2, wherein the verification check includes checking the register contents to determine whether there is a mismatch in a number of executable pages between a kernel page table of a process and a root kernel master page table.

9. The computing system of claim 2, wherein the verification check includes comparing code referenced by at least one of the register contents to a golden reference for the referenced code.

10. The computing system of claim 1, wherein the verification check is further based on a second trigger in addition to the notification and wherein the verification check includes verification of multiple buffered context information.

11. A method comprising:
executing firmware, by at least one host processor, to configure the at least one host processor to provide a notification that a content of a page table base register has changed to a device in response to the content being changed,
wherein the at least one host processor includes the page table base register,
wherein the at least one host processor is coupled to a memory,
wherein the device is separate from the at least one host processor and is capable of accessing the memory;
performing, by the device, a verification check in response to receiving the notification.

12. The method of claim 11, further comprising:
executing the firmware, by the at least one host processor, to configure the at least one host processor to send a plurality of register contents to the device in response to a management interrupt.

13. The method of claim 12, further comprising:
sending, by the device, the management interrupt to the at least one host processor as part of the verification check in response to receiving the notification, wherein the notification includes the content.

14. The method of claim 12, further comprising:
executing the firmware at a boot time prior to handing computing device operation over to an operating system to lock configuration of the notification by claiming resources in a manner such that the operating system is not able to modify the claimed resources.

15. The method of claim 12, further comprising:
determining, as part of the verification check, whether one of the register contents indicates that a user-space protection has been disabled.

16. The method of claim 12, further comprising: determining, as part of the verification check whether a kernel space mapping includes a memory page that is both writeable and executable.

17. The method of claim 12, further comprising: checking, as part of the verification check, the register contents to determine whether there is a mismatch in a number of executable pages between a kernel page table of a process and a root kernel master page table.

18. The method of claim 12, further comprising: comparing, as part of the verification check, code referenced by at least one of the register contents to a golden reference for the referenced code.

19. The method of claim 12, wherein the verification check is further based on a second trigger in addition to the notification and wherein the verification check includes verification of multiple buffered context information.

20. A non-transitory machine-readable storage medium storing instructions that, if executed by a physical processing element of a management controller, cause the management controller to:
perform a verification check in response to receiving a notification from at least one host processor of a computing system,
wherein the computing system includes the at least one host processor, a memory coupled to the at least one host processor, and the management controller also coupled to the memory, wherein the management controller is separate from the at least one host processor,
wherein the at least one host processor includes a page table base register,
wherein the at least one host processor is configured, at boot time, to provide the notification to the management controller in response to a change in a content of the page table base register;
as part of the verification check, send a management interrupt to the at least one host processor in response to receiving the notification,
receive, in response to the management interrupt, a plurality of register contents of the at least one host processor; and
perform a security action in response to one of the register contents indicating that a user-space protection has been disabled.

* * * * *